United States Patent
Park et al.

(10) Patent No.: US 10,185,175 B2
(45) Date of Patent: Jan. 22, 2019

(54) MULTI-CURVED LIQUID CRYSTAL DISPLAY PANEL

(71) Applicant: LG Display Co., Ltd., Seoul (KR)

(72) Inventors: Se-Hong Park, Gyeonggi-do (KR);
Hee-Young Chae, Gyeonggi-do (KR);
Jong-Sin Park, Gyeonggi-do (KR);
Jae-Woong Youn, Incheon (KR)

(73) Assignee: LG Display Co., Ltd., Seoul (KR)

(*) Notice: Subject to any disclaimer, the term of this patent is extended or adjusted under 35 U.S.C. 154(b) by 0 days.

(21) Appl. No.: 15/364,522

(22) Filed: Nov. 30, 2016

(65) Prior Publication Data
US 2017/0153494 A1 Jun. 1, 2017

(30) Foreign Application Priority Data
Nov. 30, 2015 (KR) .................. 10-2015-0169210

(51) Int. Cl.
*G02F 1/1335* (2006.01)
*G02F 1/1333* (2006.01)

(52) U.S. Cl.
CPC .. *G02F 1/133528* (2013.01); *G02F 1/133305* (2013.01); *G02F 1/133512* (2013.01); *G02F 1/133514* (2013.01); *G02F 2001/133531* (2013.01)

(58) Field of Classification Search
CPC ............... G02F 1/133528–2001/13355; G02F 2001/133538; G02F 1/133305; G02F 1/133512; G02F 1/133514; G02F 2001/133531
See application file for complete search history.

(56) References Cited

U.S. PATENT DOCUMENTS

| 2016/0070135 A1* | 3/2016 | Im ............... G02F 1/133514 349/96 |
| 2016/0238886 A1* | 8/2016 | Yao ............. G02F 1/133528 |
| 2016/0334834 A1* | 11/2016 | Huang .............. G06F 1/16 |
| 2017/0052562 A1* | 2/2017 | Yamawaki ......... G06F 3/041 |

* cited by examiner

*Primary Examiner* — Michael Caley
*Assistant Examiner* — Mariam Qureshi
(74) *Attorney, Agent, or Firm* — Morgan, Lewis & Bockius LLP (57) ABSTRACT

A multi-curved liquid crystal display panel includes lower and upper substrates provided with first and second regions and bonded to each other, first and second upper polarizing plates on an upper surface of the upper substrate in the first and second regions, and first and second lower polarizing plates on a lower surface of the lower substrate in the first and second regions. The orientations of absorption axes of the first upper polarizing plate and the second upper polarizing plate are different, the orientations of absorption axes of the first lower polarizing plate and the second lower polarizing plate are different, the orientations of the absorption axes of the first upper polarizing plate and the second lower polarizing plate are equal, and the orientations of the absorption axes of the first lower polarizing plate and the second upper polarizing plate are equal.

7 Claims, 5 Drawing Sheets

MULTI-CURVED LIQUID CRYSTAL DISPLAY PANEL

This application claims the benefit of Korean Patent Application No. 10-2015-0169210, filed on Nov. 30, 2015, which is hereby incorporated by reference as if fully set forth herein.

BACKGROUND

Field of the Invention

The present invention relates to a liquid crystal display panel having curved surfaces, and more particularly, to a multi-curved liquid crystal display panel having improved yield.

Discussion of the Related Art

An image display, which displays various pieces of information on a screen, is core technology in the information and communication age and is developed with a thin profile, low weight, high portability, and high performance. Therefore, a flat panel display, which may reduce weight and volume corresponding to drawbacks of a cathode ray tube (CRT), is in the spotlight. The flat panel display generally displays an image on a flat screen but, recently, to satisfy various functions, a curved display having a designated radius of curvature has been proposed.

For example, a display panel having one curved surface is introduced and, further, a display panel having one curved surface in which curvature of a central part thereof and curvature of both side parts thereof are different is introduced.

To manufacture a related art display panel having one curved surface, a flat display panel is put into a curved surface machining apparatus, and then, force is applied to the flat display penal to forcibly form a curved surface. However, in this case, an alignment axis of liquid crystals at the edge of the display panel is twisted, thereby permitting light leakage.

To solve such a problem, a method of manufacturing a curved display panel using annealing has been proposed. When a display panel is placed on a jig having a curved surface shape and annealing is carried out, moisture is evaporated from polarizing plates, thereby causing the polarizing plates to contract. As a result, the surface of the display panel is curved. However, only one curved surface may be formed through such an annealing method, and thus, if a multi-curved liquid crystal display panel is manufactured, yield is lowered.

SUMMARY

Accordingly, the present invention is directed to a multi-curved liquid crystal panel that substantially obviates one or more problems due to limitations and disadvantages of the related art.

An object of the present invention is to provide a multi-curved liquid crystal display panel having improved yield.

Additional features and advantages of the invention will be set forth in the description that follows, and in part will be apparent from the description, or may be learned by practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a multi-curved liquid crystal display panel comprises at least one first region having a cup-shaped (∪-shaped) cross-section; and at least one second region having a cap-shaped (∩-shaped) cross-section, alternately repeated.

In another aspect, a multi-curved liquid crystal display panel comprises a lower substrate and an upper substrate respectively provided with first and second regions and bonded to each other; a first upper polarizing plate and a second upper polarizing plate both on the upper surface of the upper substrate and respectively provided in the first region and the second region; and a first lower polarizing plate and a second lower polarizing plate both on the lower surface of the lower substrate and respectively provided in the first region and the second region, wherein an orientation of an absorption axis of the first upper polarizing plate and an orientation of an absorption axis of the second upper polarizing plate are different, wherein an orientation of an absorption axis of the first lower polarizing plate and an orientation of an absorption axis of the second lower polarizing plate are different, wherein the orientation of the absorption axis of the first upper polarizing plate and the orientation of the absorption axis of the second lower polarizing plate are equal, and wherein the orientation of the absorption axis of the first lower polarizing plate and the orientation of the absorption axis of the second upper polarizing plate are equal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention. In the drawings.

DETAILED DESCRIPTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
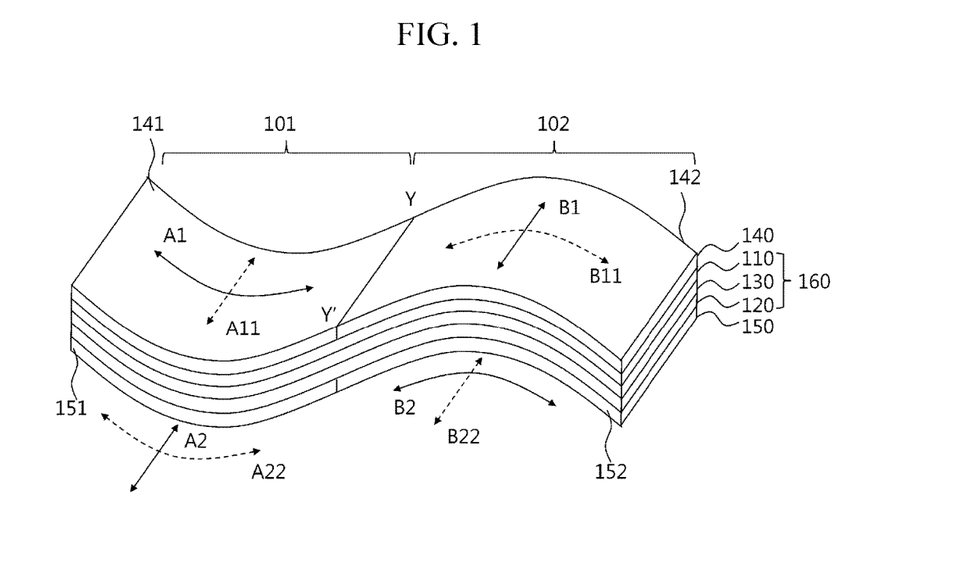
FIG. 1 is a cross-sectional view of a multi-curved liquid crystal display panel in accordance with an example embodiment of the present invention.

FIG. 1 is a cross-sectional view of a multi-curved liquid crystal display panel in accordance with the present invention.

As shown in FIG. 1, the multi-curved liquid crystal display panel has a wavy cross-sectional shape (∼ shaped) in which at least one first region 101 having a cup-shaped cross-section (∪-shaped) and at least one second region 102 having a cap-shaped cross-section (∩-shaped) are alternately repeated. A boundary Y-Y' is formed between the first region 101 and the second region 102.

The multi-curved liquid crystal display panel includes lower and upper substrates 120 and 110 respectively having the first and second regions 101 and 102 and bonded to each other, a liquid crystal layer 130 filling a space between the lower and upper substrates 120 and 110, upper polarizing plates 140 disposed on the upper surface of the upper substrate 110, and lower polarizing plates 150 disposed on the lower surface of the lower substrate 120.

Gate lines and data lines intersecting each other, thin film transistors formed at the intersections between the gate lines and the data lines, and pixel electrodes connected to the thin film transistors are formed on the lower substrate 120. The thin film transistors control voltages applied to the corresponding pixel electrodes.

The above-described lower and upper substrates 120 and 110 are bonded to each other with the liquid crystal layer 130 interposed therebetween. The liquid crystal layer 130 may be rotated by voltage applied to the pixel electrodes and control light transmittance according to a rotated degree of the liquid crystal layer 130.

The upper substrate 110 includes a plurality of color filters and a black matrix. Such a structure of the upper substrate 110 will be described later.

The upper polarizing plates 140 and the lower polarizing plates 150 transmit only a component of light having a polarization orientation that is parallel with transmission axes thereof, of light incident thereupon, thereby generating linearly polarized light.

The upper polarizing plates 140 include a first upper polarizing plate 141 provided in the first region 101 and a second upper polarizing plate 142 provided in the second region 102, and the lower polarizing plates 150 include a first lower polarizing plate 151 provided in the first region 101 and a second lower polarizing plate 152 provided in the second region 102.

The liquid crystal display panel may be configured such that the direction of an absorption axis A1 of the first upper polarizing plate 141 and the direction of an absorption axis B1 of the second upper polarizing plate 142 are different and the direction of an absorption axis A2 of the first lower polarizing plate 151 and the direction of an absorption axis B2 of the second lower polarizing plate 152 are different.

Also, the liquid crystal display panel may be configured such that the direction of the absorption axis A1 of the first upper polarizing plate 141 and the direction of the absorption axis B2 of the second lower polarizing plate 152 are equal and the direction of the absorption axis A2 of the first lower polarizing plate 151 and the direction of the absorption axis B1 of the second upper polarizing plate 142 are equal. This will be described in more detail later.

Further, the upper polarizing plates 140 and the lower polarizing plates 150 are disposed such that the directions of the absorption axes thereof are perpendicular to each other. That is, the direction of the absorption axis A1 of the first upper polarizing plate 141 and the direction of the absorption axis A2 of the first lower polarizing plate 151 are perpendicular to each other, and the direction of the absorption axis B1 of the second upper polarizing plate 142 and the direction of the absorption axis B2 of the second lower polarizing plate 152 are perpendicular to each other.

Therefore, if no voltage is applied to the pixel electrodes formed on the lower substrate 120, light emitted from a backlight unit disposed under the liquid crystal display panel is blocked by the upper polarizing plates 140. On the other hand, if voltage is applied to the pixel electrodes formed on the lower substrate 120, liquid crystals of the liquid crystal layer 130 are rotated and thus light emitted from the backlight unit may pass through the upper polarizing plates 140 due to rotation of an optical axis along the rotated liquid crystals.

To form curved surfaces, the above-described annealing method is mainly used in the related art. However, it is not easy to manufacture a multi-curved liquid crystal display panel having a plurality of curved surfaces using the annealing method. That is, if a multi-curved liquid crystal display panel is formed using a liquid crystal display panel having one undivided upper polarizing plate and one undivided lower polarizing plate, although the liquid crystal display panel is placed on a wavy jig and annealing is carried out, the liquid crystal display panel is transformed into a cup shape or a cap shape rather than a wavy shape, and thus, it is difficult to manufacture a multi-curved liquid crystal display panel.

This is caused by absorption axes of the polarizing plates. Now, absorption axes and transmission axes of polarizing plates will be described below.

The upper and lower polarizing plates 140 and 150 are manufactured by immersing polarizing plates in iodine in a liquid state and pulling both sides thereof. Here, an absorption axis is formed in the pulling direction, and a transmission axis is formed in a direction orthogonal to the absorption axis. The transmission axis transmits components of light having an orientation parallel therewith, and the absorption axis absorbs component of light having an orientation parallel therewith.

When the upper polarizing plates 140 and the lower polarizing plates 150 having absorption axes and transmission axes are attached to the upper substrate 110 and the lower substrate 120 and then annealing is carried out at a high temperature for a designated time, moisture is removed from the upper and lower polarizing plates 140 and 150 and thus the upper and lower polarizing plates 140 and 150 contract in directions of the absorption axes thereof. Here, a substrate assembly 160, formed by bonding the upper substrate 110 and the lower substrate 120, between the upper and lower polarizing plates 140 and 150 does not contract. Thus, the display panel is bent in the directions of the absorption axes of the respective upper and lower polarizing plates 140 and 150.

Hereinafter, the first and second upper polarizing plates 141 and 142 and the first and second lower polarizing plates 151 and 152 in the first and second regions 101 and 102 will be described in more detail.

FIGS. 2A to 2D are cross-sectional views of the first region and the second region of the liquid crystal display panel in which directions of absorption axes of the polarizing plates are differently set.

First, with reference to FIGS. 2A and 2B, a curved surface in the first region will be described. To describe absorption axes, it is assumed that the x-axis direction corresponds to 0 degrees and the y-axis direction corresponds to 90 degrees. Further, it is assumed that the y-axis direction is the direction of the above-described boundary Y-Y'.

Figure 2A:
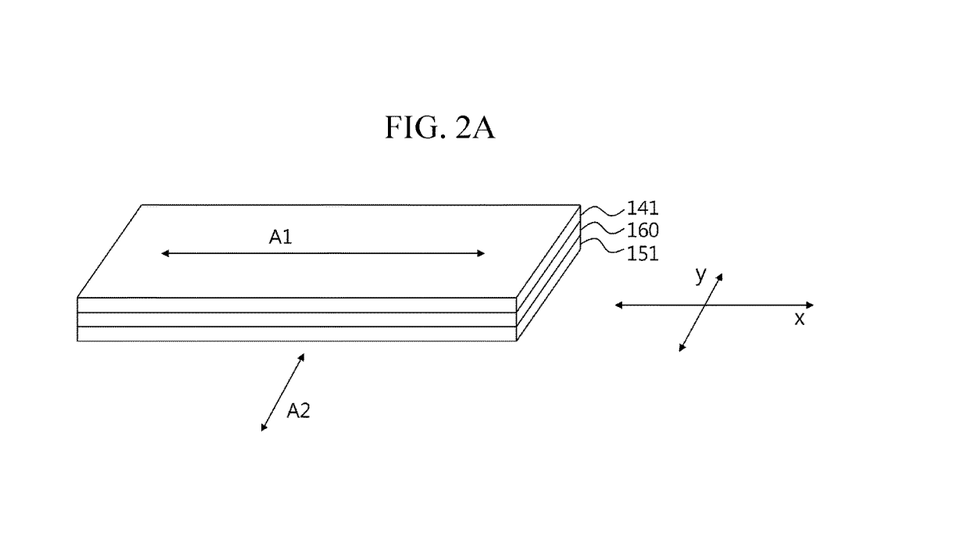
FIGS. 2A to 2D are cross-sectional views of a first region and a second region of the liquid crystal display panel in which directions of absorption axes of polarizing plates are differently set.
Figure 2B:
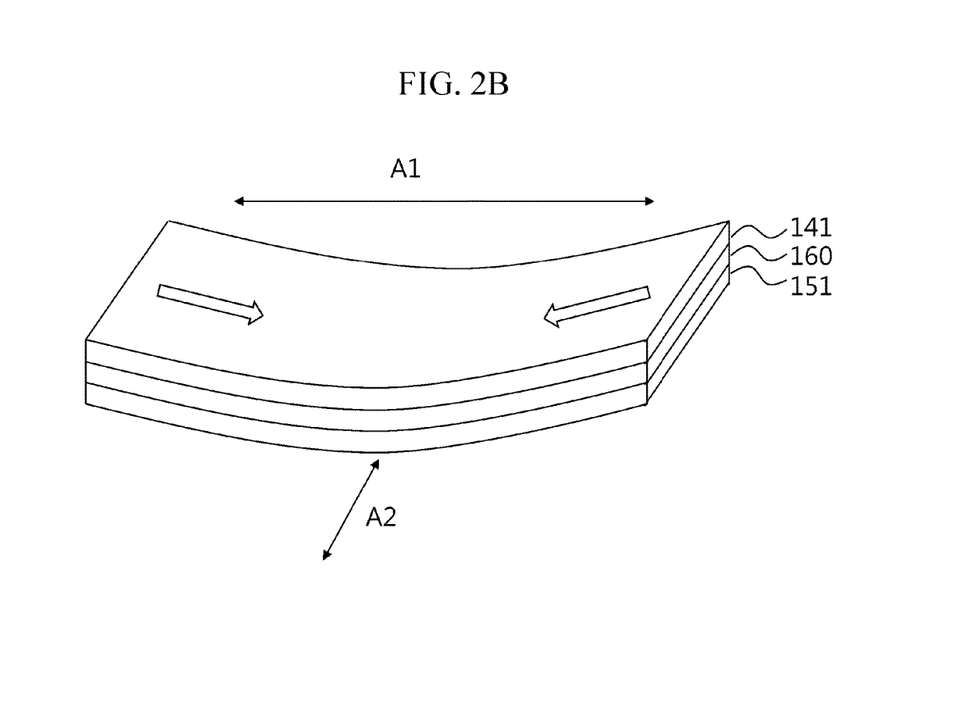

In the first region of the liquid crystal display panel shown in FIG. 2A, the absorption axis of the first upper polarizing plate 141 is in the x-axis direction and thus corresponds to 0 degrees, and the absorption axis of the first lower polarizing plate 151 is in the y-axis direction and thus corresponds to 90 degrees.

Because a polarizing plate contracts in the direction of the absorption axis thereof due to removal of moisture by annealing, as described above, as exemplarily shown in FIG. 2B, the first upper polarizing plate 141 contracts in the x-axis direction (at the angle of 0 degrees) and the first lower polarizing plate 151 contracts in the y-axis direction (at the angle of 90 degrees).

The substrate assembly 160 formed by bonding the upper substrates 140 and the lower substrates 150 does not contract. Because the first upper polarizing plate 141 attached to the non-contracting substrate assembly 160 contracts in the x-axis direction and thus, in the first region, both ends of the liquid crystal display panel in the x-axis direction are bent upwards. Therefore, the liquid crystal display panel in the first region may maintain a cup (∪) shape.

On the other hand, because the first lower polarizing plate 151 contracts in the y-axis direction, and thus, in the first region, both ends of the liquid crystal display panel in the y-axis direction tend to be bent downwards. However, in the second region connected to the first region in the x-axis direction, both ends of the liquid crystal display panel in the y-axis direction tend to be bent upwards opposite to the first region, the downward bending force in the first region is offset by the upward bending force in the second region and, thus, in the first region, both ends of the liquid crystal display panel in the y-axis direction are not actually bent downwards.

Next, with reference to FIGS. 2C and 2D, a curved surface in the second region will be described.

As described above, to describe absorption axes, it is assumed that the x-axis direction corresponds to 0 degrees and the y-axis direction corresponds to 90 degrees. Further, it is assumed that the y-axis direction is the direction of the above-described boundary Y-Y'.

Figure 2C:
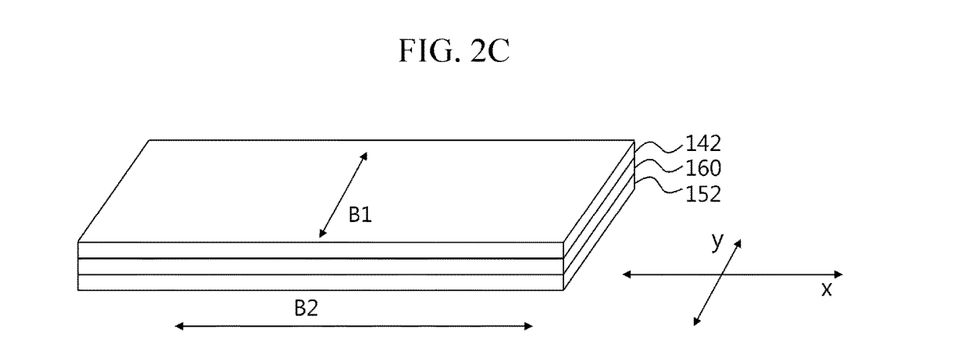
Figure 2D:
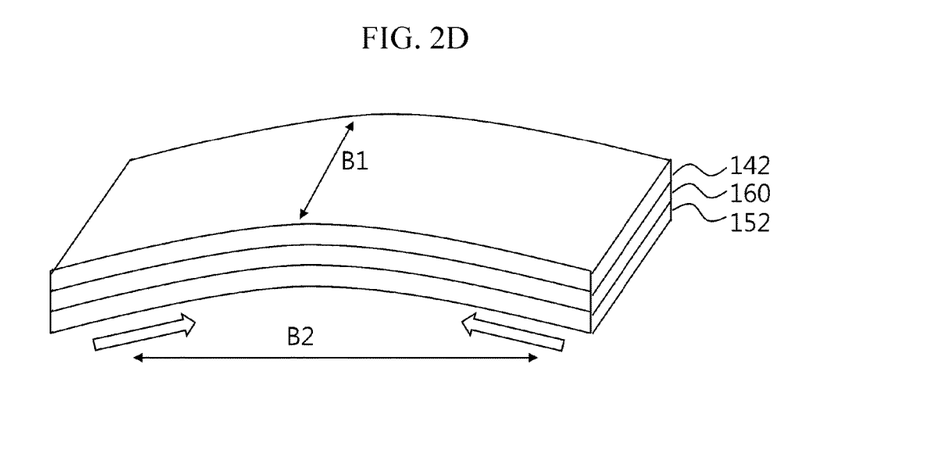

In the second region of the liquid crystal display panel shown in FIG. 2C, the absorption axis of the second upper polarizing plate 142 is in the y-axis direction and thus corresponds to 90 degrees, and the absorption axis of the second lower polarizing plate 152 is in the x-axis direction and thus corresponds to 0 degrees.

Because a polarizing plate contracts in the direction of the absorption axis thereof due to removal of moisture by annealing, as described above, as exemplarily shown in FIG. 2D, the second upper polarizing plate 142 contracts in the y-axis direction and the second lower polarizing plate 152 contracts in the x-axis direction.

The substrate assembly 160 formed by bonding the upper substrates 140 and the lower substrates 150 does not contract. Because the second lower polarizing plate 152 attached to the lower surface of the substrate assembly 160 contracts in the x-axis direction, and thus, in the second region, both ends of the liquid crystal display panel in the x-axis direction are bent downwards.

As described above, because the second upper polarizing plate 142 contracts in the y-axis direction and thus, in the second region, both ends of the liquid crystal display panel in the y-axis direction tend to be bent downwards. However, in the first region connected to the second region in the x-axis direction, both ends of the liquid crystal display panel in the y-axis direction tend to be bent upwards, the downward bending force in the second region is offset by the upward bending force in the first region, and thus, in the second region, the liquid crystal display panel is not actually bent in the y-axis direction.

In the liquid crystal display in accordance with an example embodiment of the present invention, the first upper polarizing plate 141 and the second upper polarizing plate 142 having absorption axes in different directions are attached to the first region 101 and the second region 102 of the upper surface of the substrate assembly 160, and the first lower polarizing plate 151 and the second lower polarizing plate 152 having absorption axes in different directions are attached to the first region 101 and the second region 102 of the lower surface of the substrate assembly 160.

Consequently, curved surfaces of the liquid crystal display panel are formed by the polarizing plates having absorption axes being vertical (perpendicular) to the direction of the boundary Y-Y' formed between the first region 101 and the second region 102. The polarizing plates having absorption axes being parallel with the direction of the boundary Y-Y' are not related to formation of curved surfaces of the liquid crystal display panel.

If a polarizing plate having an absorption axis being vertical to the direction of the boundary Y-Y' is attached to the upper surface of the substrate assembly 160, the first region 101 having a cup-shaped cross-section is formed. Further, if a polarizing plate having an absorption axis vertical to the direction of the boundary Y-Y' is attached to the lower surface of the substrate assembly 160, the second region 102 having a cap-shaped cross-section is formed. Such first and second regions 101 and 102 are adjacent to each other.

As described above, the first upper polarizing plate 141 having the absorption axis being vertical to the direction of the boundary Y-Y' formed between the first region 101 and the second region 102 is attached to the upper surface of the first region 101 of the substrate assembly 160. Further, the first lower polarizing plate 151 having the absorption axis being parallel with the direction of the boundary Y-Y' is attached to the lower surface of the first region 101 of the substrate assembly 160. Therefore, the first region 101 has a cup-shaped (∪-shaped) cross-section by the first upper polarizing plate 141 having the absorption axis being vertical to the direction of the boundary Y-Y'.

On the other hand, the second lower polarizing plate 152 having the absorption axis being vertical to the direction of the boundary Y-Y' formed between the first region 101 and the second region 102 is attached to the lower surface of the second region 102 of the substrate assembly 160. Further, the second upper polarizing plate 142 having the absorption axis being parallel with the direction of the boundary Y-Y' is attached to the upper surface of the second region 102 of the substrate assembly 160. Therefore, the second region 102 has a cap-shaped (∩-shaped) cross-section by the second lower polarizing plate 152 having the absorption axis being vertical to the direction of the boundary Y-Y'.

If the direction of the absorption axis of the first lower polarizing plate 151 is vertical to the direction of the boundary Y-Y' formed between the first region 101 and the second region 102, although the liquid crystal display panel is placed on a jig having a cup-shaped (∪-shaped) cross-section and then annealing is carried out, both ends of the liquid crystal display panel in the y-axis direction are bent downwards and thus the cup (∪) shape may not be maintained.

If each of the upper polarizing plate 140 and the lower polarizing plate 150 is not divided into the first and second regions 101 and 102 and is formed as a single integral polarizing plate, one cup (∪) shape or one cap (∩) shape may be easily formed but it is difficult to manufacture a multi-curved liquid crystal display panel.

Therefore, a multi-curved liquid crystal display panel may be manufactured by dividing a upper polarizing plate and a lower polarizing plate into first and second upper polarizing plates in the first and second regions and first and second lower polarizing plates in the first and second regions and disposing the polarizing plates such that the absorption axes of the polarizing plates are provided to satisfy cross-sectional shapes desired to be formed in the first and second regions.

Figure 3A:
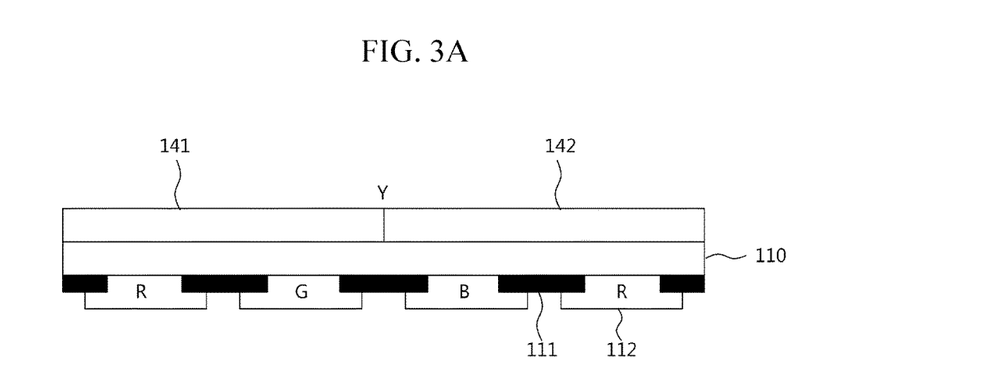
FIGS. 3A and 3B are cross-sectional views illustrating dispositions of color filters and a black matrix formed on an upper substrate.
Figure 3B:
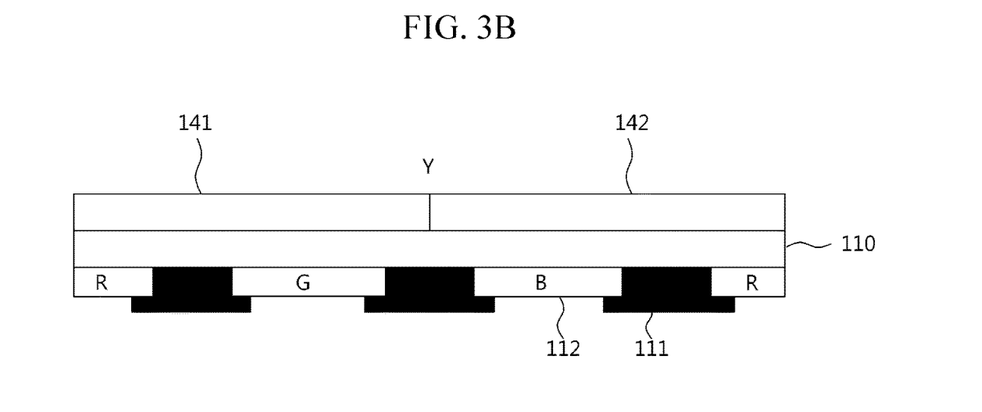

FIGS. 3A and 3B are cross-sectional views illustrating dispositions of color filters and a black matrix formed on an upper substrate.

As shown, for example, in FIGS. 3A and 3B, red (R), green (G), and blue (B) color filters 112 corresponding to a plurality of pixel electrodes formed on the lower substrate 120 are provided on the upper substrate 110. A black matrix 111 is provided in regions between the R, G, and B color filters 112.

The respective R, G, and B color filters 112 filter light having passed through the liquid crystal layer to have red (R), green (G), and blue (B) colors. Further, the black matrix 111 provided in the regions between the R, G, and B color filters 112 divides R, G, and B color regions from each other.

The first upper polarizing plate 141 and the second upper polarizing plate 142 are attached to the upper surface 110 such that the first and second upper polarizing plates 141 and 142 contact each other. As shown, for example, in FIGS. 3A and 3B, the boundary Y-Y' formed between the first upper polarizing plate 141 and the second upper polarizing plate 142 overlap with a part of the black matrix 111 formed on the upper substrate 110. Therefore, the boundary Y-Y' formed between the first upper polarizing plate 141 and the second upper polarizing plate 142 becomes invisible by the black matrix.

Figure 4:
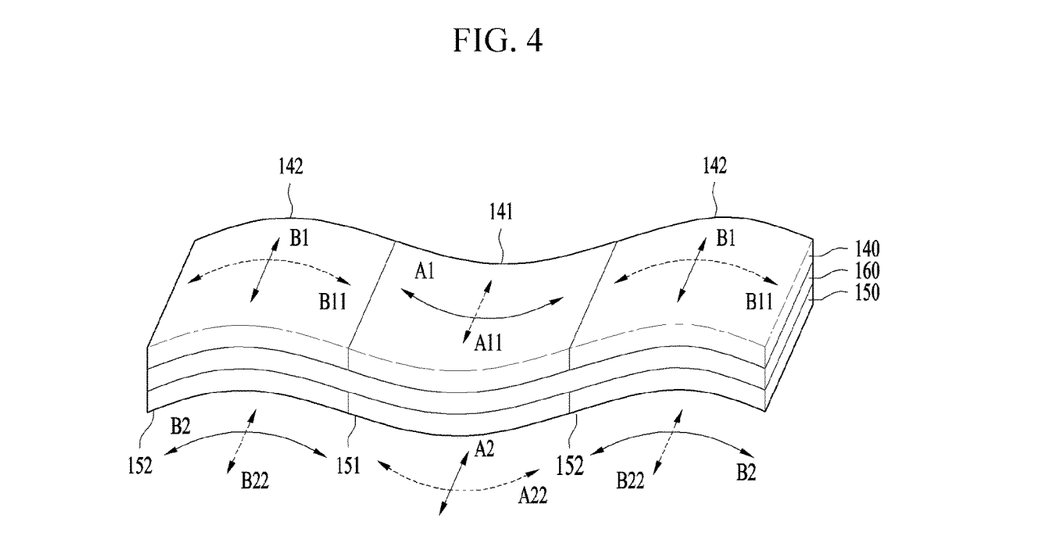
FIG. 4 is a cross-sectional view illustrating curved surfaces of a multi-curved liquid crystal display panel.

FIG. 4 is a cross-sectional view illustrating various cross-sectional shapes of a multi-curved liquid crystal display panel.

FIG. 4 illustrates a liquid crystal display panel including a second region 102, a first region 101 and a second region 102, which are alternately disposed, and having a wavy cross-sectional shape. Even in this case, in the first regions 101 having a cup-shaped cross-section and the second region 102 having a cap-shaped cross-section, polarizing plates having absorption axes in different directions are divisionally provided, as described above.

Although FIG. 4 illustrates the liquid crystal display panel including the first region 101, the second region 102 and the first region 101, the disclosure is not limited thereto and a plurality of first and second regions may be alternately repeated.

Figure 5:
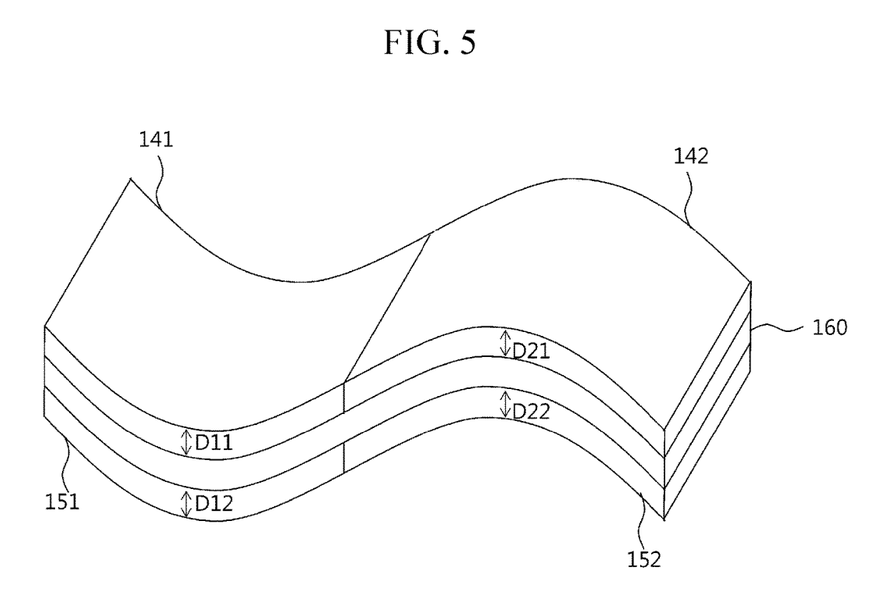
FIG. 5 is a cross-sectional view illustrating a thickness ratio of a multi-curved liquid crystal display panel in accordance with one embodiment of the present invention.

FIG. 5 is a cross-sectional view illustrating a thickness ratio of a multi-curved liquid crystal display panel in accordance with one embodiment of the present invention.

With reference to FIG. 5, to form a first region 101 and a second region 102 having curved surfaces with the same curvature, i.e., to form a first region 101 and a second region 102 having symmetrical curved surfaces to each other, the thickness D11 of the first upper polarizing plate 141 in the first region 101 and the thickness D22 of the second lower polarizing plate 152 in the second region 102 are set equal. Further, the thickness D12 of the first lower polarizing plate 151 in the first region 101 and the thickness D21 of the second upper polarizing plate 142 in the second region 102 are set equal.

That is, the first upper polarizing plate 141 and the second lower polarizing plate 152 having the absorption axes being vertical to the direction of the boundary Y-Y' between the first region 101 and the second region 102 to form curved surfaces of the liquid crystal display panel are set to have the same thickness.

Further, the second upper polarizing plate 142 and the first lower polarizing plate 151 having the absorption axes being parallel with the direction of the boundary Y-Y' between the first region 101 and the second region 102 to form curved surfaces of the liquid crystal display panel are set to have the same thickness.

As such, if the first upper polarizing plate 141 and the second lower polarizing plate 152 have the same thickness and the first lower polarizing plate 151 and the second upper polarizing plate 142 have the same thickness, curved surfaces having the same curvature in the first and second regions may be acquired.

In accordance with example embodiments of the present invention, as described herein, a multi-curved liquid crystal display panel may have a wavy (~) cross-sectional shape in which at least one first region having a cup-shaped (∪-shaped) cross-section and at least one second region having a cap-shaped (∩-shaped) cross-section are alternately repeated. The direction of an absorption axis of a first upper polarizing plate provided in the first region may be vertical to the direction of a boundary between the first and second regions, and the direction of an absorption axis of a first lower polarizing plate provided in the first region may be vertical to the direction of the absorption axis of the first upper polarizing plate. The direction of an absorption axis of a second lower polarizing plate provided in the second region may be vertical to the direction of the boundary between the first and second regions, and the direction of an absorption axis of a second upper polarizing plate provided in the second region may be vertical to the direction of the absorption axis of the second lower polarizing plate. The boundary between the first region and the second region may overlap a black matrix provided on the upper substrate. The thickness of the first upper polarizing plate may be the same as the thickness of the second lower polarizing plate, and the thickness of the second upper polarizing plate may be the same as the thickness of the first lower polarizing plate.

Additionally, as apparent from the above description, in a multi-curved liquid crystal display panel in accordance with example embodiments of the present invention, manufacture of the multi-curved liquid crystal display panel having two or more curved surfaces is facilitated using polarizing plates having absorption axes in different directions according to shapes of curved surfaces, thereby improving yield of the multi-curved liquid crystal display panel. Further, although upper and lower divisional polarizing plates are attached to upper and lower substrates, a boundary between the divisional polarizing plates is disposed to overlap a black matrix, and thus, the boundary between the polarizing plates may be invisible. Moreover, a first upper polarizing plate and a second lower polarizing plate have the same thickness and a first lower polarizing plate and a second upper polarizing plate have the same thickness and thus curvature of the liquid crystal display panel in a first region and curvature of the liquid crystal display panel in a second region may be equal.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A multi-curved liquid crystal display panel, comprising:
- a substrate assembly including a liquid crystal layer between a lower substrate and an upper substrate, the substrate assembly having at least one first region and at least one second region, alternately repeated;
- a lower polarizing plate including a first lower polarizing plate on the first region of the lower substrate, and a second lower polarizing plate on the second region of the lower substrate; and
- an upper polarizing plate including a first upper polarizing plate on the first region of the upper substrate, and a second upper polarizing plate on the second region of the upper substrate,
- wherein the first region of the substrate assembly, the first lower polarizing plate and the first upper polarizing plate have a cup-shaped (∪-shaped) cross-section,
- wherein the second region of the substrate assembly, the second lower polarizing plate and the second upper polarizing plate have a cap-shaped (∩-shaped) cross-section,
- wherein an orientation of an absorption axis of the first lower polarizing plate is orthogonal to an orientation of an absorption axis of the first upper polarizing plate and an orientation of an absorption axis of the second lower polarizing plate, and
- wherein an orientation of an absorption axis of the second upper polarizing plate is the same as the orientation of the absorption axis of the first lower polarizing plate.

2. The multi-curved liquid crystal display panel according to claim 1,
- wherein the orientation of the absorption axis of the first upper polarizing plate is equal to the orientation of the absorption axis of the second lower polarizing plate.

3. The multi-curved liquid crystal display panel according to claim 1, wherein the absorption axis of the first upper polarizing plate is vertical relative to a direction of a boundary between the first and second regions, and
- wherein the absorption axis of the first lower polarizing plate is parallel to the direction of the boundary between the first and second regions.

4. The multi-curved liquid crystal display panel according to claim 1, wherein the upper substrate includes a plurality of color filters and a plurality of black matrices disposed between the color filters, the boundary between the first region and the second region overlapping at least a portion of the black matrix.

5. The multi-curved liquid crystal display panel according to claim 1, wherein the first region and the second region are alternated at least two times.

6. The multi-curved liquid crystal display panel according to claim 1, wherein a thickness of the first upper polarizing plate is the same as a thickness of the second lower polarizing plate; and
- wherein a thickness of the second upper polarizing plate is the same as a thickness of the first lower polarizing plate.

7. The multi-curved liquid crystal display panel according to claim 1, wherein the extrema points of the substrate assembly, the lower polarizing plate, and the upper polarizing plate adjacent in a first direction have the same distance from a boundary between the first and second regions in a second direction which is orthogonal to the first direction, and
- wherein the first direction is parallel to the direction of the boundary between the first and second regions.

* * * * *